(12) United States Patent  
Barton

(10) Patent No.: US 12,499,124 B2  
(45) Date of Patent: Dec. 16, 2025

(54) SYSTEMS AND METHODS FOR DATA TRANSFORMS IN A DATA MANAGEMENT ENVIRONMENT

(71) Applicant: Nextworld, LLC, Greenwood Village, CO (US)

(72) Inventor: Kendra Barton, Parker, CO (US)

(73) Assignee: Nextworld, LLC, Greenwood Village, CO (US)

( * ) Notice: Subject to any disclaimer, the term of this patent is extended or adjusted under 35 U.S.C. 154(b) by 0 days.

(21) Appl. No.: 18/744,977

(22) Filed: Jun. 17, 2024

(65) Prior Publication Data

US 2024/0419681 A1    Dec. 19, 2024

Related U.S. Application Data

(60) Provisional application No. 63/508,968, filed on Jun. 19, 2023.

(51) Int. Cl.
*G06F 16/25*    (2019.01)

(52) U.S. Cl.
CPC .................. *G06F 16/258* (2019.01)

(58) Field of Classification Search
CPC ........ G06F 16/258; G06F 16/254; G06F 8/40; G06F 16/27
See application file for complete search history.

(56) References Cited

U.S. PATENT DOCUMENTS

| | | | |
|---|---|---|---|
| 7,117,219 B1* | 10/2006 | Powers | G06F 16/26 707/603 |
| 11,297,099 B2* | 4/2022 | Tong | H04L 63/10 |
| 2004/0186915 A1* | 9/2004 | Blaszczak | G06F 12/023 718/100 |
| 2006/0106856 A1* | 5/2006 | Bermender | G06F 16/254 707/999.102 |
| 2013/0332899 A1* | 12/2013 | Stewart | G06F 9/44505 717/121 |
| 2018/0357255 A1* | 12/2018 | Arasan | G06F 16/182 |
| 2021/0279062 A1* | 9/2021 | Shah | G06F 11/3006 |
| 2022/0269978 A1* | 8/2022 | Edwards | G06N 20/00 |

* cited by examiner

*Primary Examiner* — Cheyne D Ly

(57) ABSTRACT

The present technology pertains to systems and methods for executing data transformations within cloud-based service environments, such as SaaS platforms. The technology disclosed herein utilizes logic blocks to perform data transformations, incorporating all necessary logic and metadata to propagate changes in data structure. In an embodiment, a method includes receiving input that specifies a desired data transformation, creating a logic block to define the transformation, developing a transformation plan, and executing the logic block as per the plan to alter data stored in identified tables. Generating the transformation plan includes identifying the tables that contain the data to be transformed. The system described herein allows for efficient, consistent, and secure data transformations across multiple tenants in a distributed cloud service environment.

20 Claims, 10 Drawing Sheets

FIGURE 5A

DATA TRANSFORM EXECUTION ⓘ ⚙ DEBUG▾ | ⚙ EXECUTE TRANSFORM(S)▾ | ⟲ SAVE AND EXIT▾ | ⟳ REFRESH | ✕ CLOSE

Execution Plan Name * ⓘ: MyExecutionPlan
Lifecycle 🔒 *: base
Transform Status: ✱ New
Release: 23.1

☐ Transform Test 🔒    ☑ Draft Mode    ☑ Include Dependencies 🔒    ☐ Bulk Audit

View Control — > Filter — > Sort — > Aggregation

| | ↓ Data Transform * | ↓ Logic Block | ↓ Tenant * | ↓ Environment * | ↓ Bulk Audit | ↓ Status | ↓ ID | ↓ Job Status |
|---|---|---|---|---|---|---|---|---|
| ⌄ ▸ | MyDataTransform | MyTransformLogicBlock | nwprodtools | ToolsDev.dev | ☐ | ✱ New | | |
| ⌄ ▸ | MyDataTransform | MyTransformLogicBlock | nwprodtools | ToolsDev.dev | ☐ | ✱ New | | |
| ⌄ ▸ | MyDataTransform | MyTransformLogicBlock | _base | ToolsDev.stable | ☐ | ✱ New | | |
| ⌄ ▸ | MyDataTransform | MyTransformLogicBlock | _base | ToolsDev.stable | ☐ | ✱ New | | |
| ⌄ ▸ | MyDataTransform | MyTransformLogicBlock | riscore | ToolsDev.dev | ☐ | ✱ New | | |
| ⌄ ▸ | MyDataTransform | MyTransformLogicBlock | riscore | ToolsDev.dev | ☐ | ✱ New | | |
| ⌄ ▸ | MyDataTransform | MyTransformLogicBlock | demonw | ToolsDev.dev | ☐ | ✱ New | | |
| ⌄ ▸ | MyDataTransform | MyTransformLogicBlock | demonw | ToolsDev.dev | ☐ | ✱ New | | |
| ⌄ ▸ | MyDataTransform | MyTransformLogicBlock | _base | ToolsDev.dev | ☐ | ✱ New | | |
| ⌄ ▸ | MyDataTransform | MyTransformLogicBlock | _base | ToolsDev.dev | ☐ | ✱ New | | |

≪ ≺ 1 ≻ ≫  15 ▾

12                                                                            COLUMNS ▾

FIGURE 5D

| DATA TRANSFORM EXECUTION ⓘ ⚙ DEBUG▽ | | | | | | | ⚙ CREATE NEW FROM FAILURES▽ | ⟳ REFRESH | ✕ CLOSE |
|---|---|---|---|---|---|---|---|---|---|
| Execution Plan Name * ⓘ<br>MyExecutionPlan | | | Lifecycle 🔒 *<br>base | | | ☐ Draft Mode | Transform Status<br>⚠ Error | Release<br>23.1 | |
| ☐ Transform Test 🔒 | | | | | | | ☑ Include Dependencies 🔒 | ☐ Bulk Audit | |
| View Control | ＞ Filter | ＞ Sort | ＞ Aggregation | | | | | | |
| ⊙▽ | ↓Data Transform* | ↓Logic Block | ↓Tenant * | ↓Environment * | ↓Bulk Audit | ↓Status | ↓ID | ↓Job Status | ↓Summary |
| ▷ | MyDataTransform | MyTransformLo | nwprodtto | ToolsDev.dev | ☐ | ✓ Completed | 4cf55fc2-da40 | ✓ Success | ReceivablesDetail |
| ▷ | MyDataTransform | MyTransformLo | nwprodtto | ToolsDev.dev | ☐ | ✓ Completed | 4c89b088-da40 | ✓ Success | ReceivablesDetail |
| ▷ | MyDataTransform | MyTransformLo | _base | ToolsDev.sta | ☐ | ✓ Completed | 4c9b289a-da40 | ✓ Success | ReceivablesDetail |
| ▷ | MyDataTransform | MyTransformLo | _base | ToolsDev.sta | ☐ | ⚠ Error | 4bdc3458-da40 | ✓ Success | ReceivablesDetail |
| ▷ | MyDataTransform | MyTransformLo | riscore | ToolsDev.dev | ☐ | ✓ Completed | 4b0ba64e-da40 | ✓ Success | ReceivablesDetail |
| ▷ | MyDataTransform | MyTransformLo | riscore | ToolsDev.dev | ☐ | ✓ Completed | 4b796710-da40 | ✓ Success | ReceivablesDetail |
| ▷ | MyDataTransform | MyTransformLo | demonw | ToolsDev.dev | ☐ | ✓ Completed | 4dab5879-da40 | ✓ Success | ReceivablesDetail |
| ▷ | MyDataTransform | MyTransformLo | demonw | ToolsDev.dev | ☐ | ⚠ Error | 4dga8934-da40 | ✓ Success | ReceivablesDetail |
| ▷ | MyDataTransform | MyTransformLo | _base | ToolsDev.dev | ☐ | ✓ Completed | 4dbc3469-da40 | ✓ Success | ReceivablesDetail |
| ▷ | MyDataTransform | MyTransformLo | _base | ToolsDev.dev | ☐ | ✓ Completed | 4ebv3564-da40 | ✓ Success | ReceivablesDetail |
| | | | | | ≪ ＜ 1 ＞ ≫ 15▽ | | | | COLUMNS ▽ |
| 12 | | | | | | | | | |

FIGURE 5E

SYSTEMS AND METHODS FOR DATA TRANSFORMS IN A DATA MANAGEMENT ENVIRONMENT

CROSS-REFERENCE TO RELATED APPLICATIONS

This application claims priority to U.S. Provisional Application No. 63/508,968 titled SYSTEMS AND METHODS FOR DATA TRANSFORMS IN A DATA MANAGEMENT ENVIRONMENT, filed Jun. 19, 2023, which is incorporated herein by reference in its entirety for all purposes.

TECHNICAL FIELD

Various embodiments of the present technology generally relate to data transformations, and more specifically to systems and methods for creating logic blocks and execution plans for implementing data transformations in cloud-based service environments.

BACKGROUND

Businesses routinely develop custom software for a variety of purposes. Custom software can streamline various projects, automate routine functions, meet client demands, and provide features that enhance the user experience. Developing custom software for specific business purposes can quickly become a complex task, often involving writing extensive lines of source code in a suitable programming language. Typically, individuals who understand the business needs for the software lack the coding experience required to create enterprise-level software. Consequently, these individuals must collaborate with software development specialists who write, test, and maintain the code.

Data transformations are employed to update business data so that it can operate with a modified application. Examples of application changes include adding fields to a table, removing fields from a table, and altering how table values are calculated. Typically, a data transformation runs against only one table per transformation. Standard data transformations usually execute without integrity checks that protect data. As a result, data transformations are used sparingly. Conventional data transformations do not enforce security, nor do they execute any validations or table triggers. Unfortunately, when a change is made to a design or when a logic block is used to accommodate table changes, these data transformation limitations must be considered before creating a data transformation.

It is with respect to this general technical environment that aspects of the technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to systems and methods for performing data transformations. More specifically, some embodiments relate to systems and methods for implementing data transform logic blocks. In accordance with an embodiment of the present technology, a method includes receiving an input describing a data transformation, generating a logic block defining the data transformation, generating a transform plan for performing the data transformation, and executing the logic block according to the transform plan to transform the data stored in the at least one. Generating the transform plan includes identifying at least one table storing data on which to perform the data transformation.

In some embodiments, the logic block defining the data transform includes metadata defining the data transform. Generating the transform plan may further include identifying one or more dependencies between the at least one table and determining an order of operations for performing the data transform. Generating the transform plan may further include identifying the at least one environment in which to perform the data transform, wherein the at least one environment includes the at least one table. Generating the transform plan may also include optimizing operations that occur in parallel for performing the data transformation to minimize time spent performing the data transformation. Generating the transform plan may also include determining if bulk auditing is available for the data transformation. In some examples, the input describing the transformation is entered into fields in a logic blocks application by one or more users. The data transformation may include one or more of adding a field, removing a field, or changing a field of the data in the at least one table.

In another embodiment, a system includes one or more computer-readable storage media, a processing system operatively coupled with the one or more computer-readable storage media, and program instructions stored on the one or more computer-readable storage media. The program instructions, when read and executed by the processing system, direct the processing system to at least receive an input describing a data transformation, generate a logic block defining the data transformation, generate a transform plan for performing the data transformation, and execute a logic block according to the transform plan to transform the data stored in the at least one table. To generate the transform plan, the program instructions direct the processing system to identify at least one table storing data on which to perform the data transformation.

In yet another embodiment, one or more computer readable storage media have program instructions stored thereon for performing data transformations. The program instructions, when read and executed by a processing system, direct the processing system to at least receive an input describing a data transformation, generate a logic block defining the data transformation, generate a transform plan for performing the data transformation, and execute the logic block according to the transform plan to transform the data stored in the at least one table. To generate the transform plan, the program instructions direct the processing system to identify at least one table storing data on which to perform the data transformation.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 5A-5E illustrate an example of a graphical user interface for implementing data transforms in accordance with some embodiments of the present technology.

Figure 1:
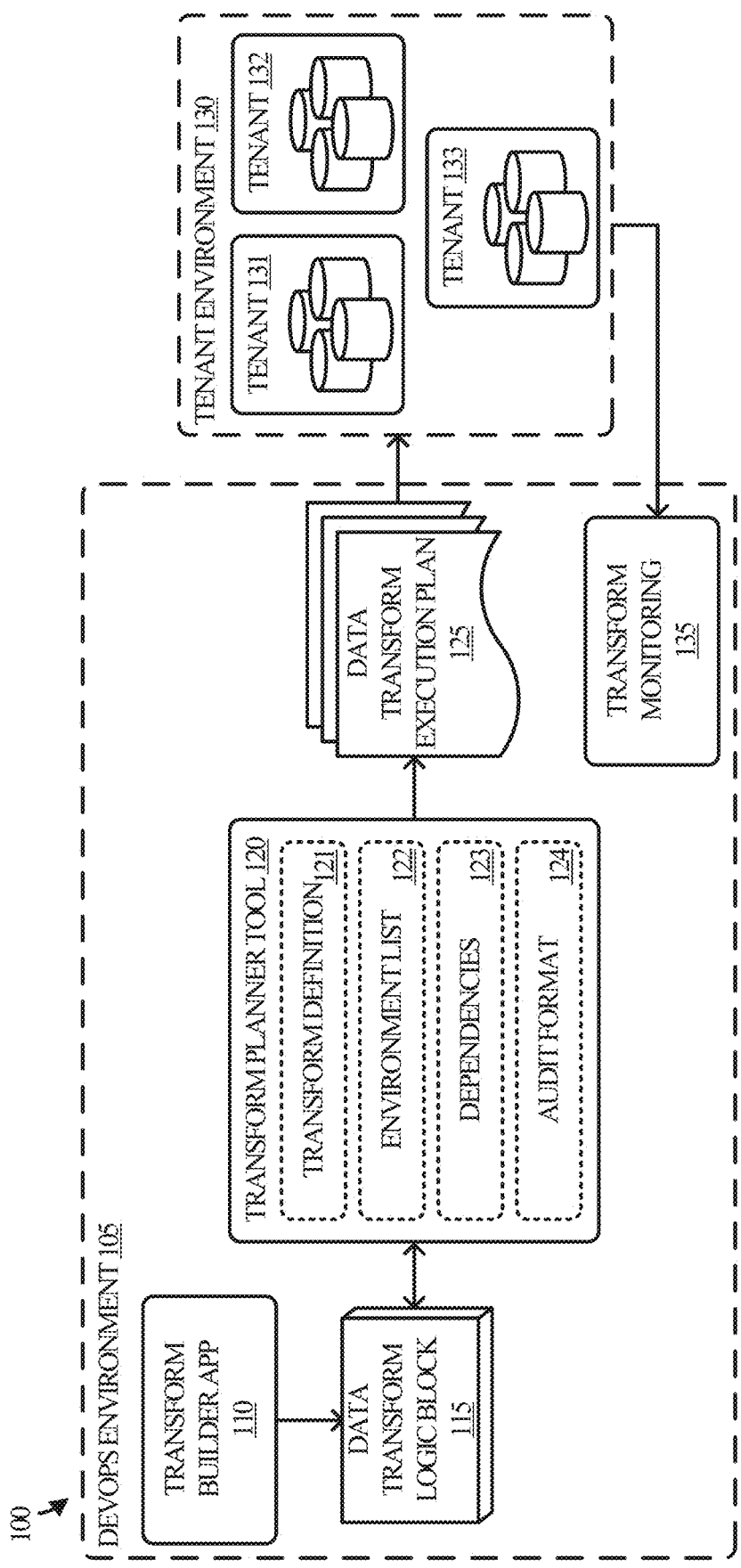
FIG. 1 illustrates an example of a data transform environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The present technology generally relates to performing data transformations. More specifically, the present technology includes systems and methods for performing data transformations in multi-tenant distributed cloud environments (i.e., SaaS environments). A data transform (or data transformation), as described herein, is a process that modifies the structure or content of stored data, such as changing, adding, or removing fields stored in a table to ensure consistency and compatibility with updated applications. Data transformations ensure that all data across distributed locations conforms to the new schema or logic requirements specified by the transformation.

Transforming data in distributed SaaS environments presents significant challenges. Ensuring data consistency across distributed nodes is a primary concern, as changes must be uniformly propagated across all instances to prevent discrepancies and potential failures. Systems performance is another critical factor, as data transformations can be resource-intensive and impact the availability of the SaaS services. This impact is amplified in multi-tenant systems where multiple tenants can be affected simultaneously. Additionally, the complexity of schema dependencies further complicates the process, necessitating meticulous planning and coordination to ensure system integrity and prevent disruptions.

Thus, the present technology pertains to handling data transformations in various data structures in SaaS platforms designed to manage extensive data distributed across a wide range of locations, while maintaining flexibility in handling those data structures. The systems and methods for performing data transformations disclosed herein provide the ability to propagate changes in data structures efficiently and uniformly across all relevant data storage locations. When changes are made to a data table, such as the addition of a new data field, these changes are systematically applied to all instances of the data stored in that format, ensuring consistency and uniformity.

To address the aforementioned requirements that must accompany a data transformation, data transformations, in accordance with the present disclosure, are deployed as logic blocks that encompass all necessary logic (i.e., metadata) for propagating the changes in a data shape. For example, when a new field is added to a data table and populated, the data transform ensures that this change is uniformly applied to all existing data stored in the corresponding format across all locations. The process guarantees that preexisting data is updated to align with the new data structure.

A data transform, in accordance with the present disclosure, is a logic block that is attached or registered to a specific software release. A data transform logic block, therefore, executes at a release boundary without data mutation safeguards. A data transform logic block, however, may also execute at any other time when pre-existing data requires unified repair. Upon execution of the release, the data transform updates all relevant data according to its defined logic. This approach ensures seamless and consistent data transformations across the entire platform, eliminating the need for manual interventions and reducing potential errors and inconsistencies.

A logic block, in accordance with the present disclosure, is a discrete unit of functionality that encapsulates a set of instructions, rules, and/or logic for performing specific operations or transformations on data. Logic blocks are defined and driven by metadata, allowing for flexible and dynamic programing paradigms. Each logic block performs a defined function, such as data validation, transformation, or computation, and its behavior is governed by metadata that includes definitions of data structures, rules, mapping, configurations, and the like. This metadata-driven approach enables the use of logic blocks across different contexts and applications without the need for modification, promoting modularity and facilitating easier maintenance, testing, and updates.

Logic blocks, as discussed herein, can interact with other blocks to form pipelines or workflows where data flows from one block to the next, each applying specific logic. This interoperability may be defined through metadata, specifying how blocks should connect and communicate. Since the execution of logic blocks can be modified at runtime based on changing metadata, systems can adapt to new requirements or conditions without altering the underlying code. In the example of a data transformation, a logic block might transform data from one schema to another, with metadata defining the mapping rules, validation rules, and transformation logic. This approach creates highly flexible and adaptable systems that can easily accommodate changes in business logic, data structures, and processing rules.

Before executing the release with which a data transform is associated, introspective tooling disclosed herein is employed to meticulously examine the release, with a particular focus on the data transform. This examination includes assessing the contents of the data transform, identifying the necessary activities to complete the transformation, and determining the specific locations where updates need to be applied. As a part of this process, the introspective tooling identifies dependencies to establish a correct sequence for performing the data transform tasks. For example, certain changes to a table may need to be completed before others due to pre-existing dependencies. Even in cases wherein explicit dependencies do not exist, implicit dependencies may arise due to operational constraints. For example, the introspective tooling may ensure that multiple transforms or other operations do not run on the same piece of data at the same time to prevent overwriting or similar errors. Thus, at the point of execution, one batch job is submitted with included job dependencies to prevent concurrent execution where the same data store is mutated and where dependencies between transforms have been explicitly identified in the data transform record.

Introspective tooling is also leveraged to maximize parallel processing by distributing the workload as broadly as possible, such as for tasks that do not require a specific order of execution. This strategy minimizes downtime by ensuring the multiple tasks are being executed simultaneously without conflict. Thus, efficiency is enhanced by maximizing parallel operations while the risk of collisions during the update process is minimized.

Introspective tooling is also responsible for identifying the most efficient methods for fulfilling auditing requirements. For uniform changes applied to a large volume of records, bulk auditing may be employed to conserve resources, summarizing changes in a concise manner (e.g., "1.2 million records changed to 'x'"). However, scenarios that do not qualify for bulk auditing due to compliance rules or other constraints may require detailed, record-by-record auditing. In such cases, the updated data is documented individually as each line completes, ensuring compliance and accuracy in auditing.

Once the release is executed and the data transform is applied to the relevant tables, each affected unit reports back to a centralized location within the operations engineering environment. These reports provide detailed outcomes of the update process, indicating whether the update was successful, if any failures occurred, and the extent of the update in terms of the number of tables affected. This centralized reporting ensures comprehensive monitoring and assessment of the data transformation process.

FIG. 1 illustrates transform environment 100 in which data transform systems and processes are implemented in accordance with various embodiments of the present technology. Transform environment 100 includes devops (i.e., development and operations) environment 105 and tenant environment 130. Devops environment 105 includes transform builder application 110, data transform logic block 115, transform planner tool 120, data transform execution plan 125, and transform monitoring 135. Transform planner tool 120 includes transform definition 121, environment list 122, dependencies 123, and audit format 124. Tenant environment 130 includes tenant 131, tenant 132, and tenant 133. In other examples, transform environment 100, including devops environment and tenant environment 130 may include additional or different elements than those included in the example of FIG. 1.

Transform builder application 110 is representative of an application in which a data transform can be defined through metadata entered into various input fields of the application. Via the application, a user may define what types of data need to be transformed and how to transform the data. For example, the user may indicate in the application that all records containing a data field in them need to be transformed such that the date field is stored in a different format. The user may also indicate relevant information about the transform such as a name, a product family, an owner or creator of the transform, known dependencies, whether the transform is eligible for bulk auditing, or the like. The user may additionally indicate a future software release with which the data transform should be released. In addition to defining the data transform, transform builder application 110 may be used to create logic blocks, test data transforms, generate execution plans, display tables or other information relevant to the data transform and its execution, and the like. Examples of what transform builder application 110 may include are provided in FIGS. 5A-5E.

Once a user has defined the data transform via transform builder application 110, data transform logic block 115 is created based on the data transform. Logic block 115 is a discrete unit of logic or instructions for performing the data transform. Logic block 115 is defined and driven by metadata. Thus, logic block 115 includes information defining the data transformation as provided by the user via transform builder application 110 in a format that can be executed upon release of the logic block. Data transform logic block 115 includes metadata specifically describing the logic needed to perform the transformation.

Once logic block 115 is created, transform planner tool 120 uses data transform logic block 115 and the data transform defined therein to generate data transform execution plan 125. Transform planner tool 120 is a piece of introspective tooling that creates data transform execution plan 125. Transform planner tool 120 uses and/or generates transform definition 121, environment list 122, dependencies 123, and audit format 124 during the creation of data transform execution plan 125. For example, transform planner tool may generate environment list 122 based on transform definition 121 and/or other pieces of information from data transform logic block 115. Environment list 122 includes a list of one or more environments in tenant environment 130 that have data needing to be transformed. Environment list 122, in some examples, is compiled by transform planner tool 120 upon searching tenant environment 130 for tables in various environments needing transformed. In other examples, environment list 122 may be provided by a user, such as via transform builder application 110. In some examples, transform planner tool 120 also includes one or more table lists including each table needing transformed inside of the environments in environment list 122.

Dependencies 123 is a list or other definition of explicit or implicit dependencies associated with data transform logic block 115. Dependencies 123 is used to generate an order of operations for performing the data transform via data transform execution plan. Dependencies 123 are used at least in part to determine what operations can occur in parallel and what operations must occur sequentially. Based at least in part on dependencies 123, transform planner tool 120 may try to optimize performance of the data transform by causing as many operations to occur in parallel as possible to reduce system downtime if necessary for performing the data transformation. For example, dependencies 123 may include one or more explicit dependencies defined by a user via transform builder application 110.

A dependency, as referred to herein, is a relationship between tables or data within tables where the transformation of one table or dataset must occur before (or at a different time from) another due to the interconnected nature of the data. The hierarchical sequence ensures data integrity and accuracy, as dependent transformations rely on the completion of preceding steps to function correctly. An explicit dependency may therefore require that one piece of data be transformed prior to another. An implicit dependency, however, may require that only one piece of data be transformed at a time or that one piece of data only be subject to one transform at a time. Explicit dependencies, in some examples, may be indicated by a user via transform builder application 110. Implicit dependencies, however, are found by transform planner tool 120 and added to dependencies 123. Transform planner tool 120, in some examples, may also discover explicit dependencies and add then to dependencies 123.

When a data transform in accordance with the example of FIG. 1 is run, the batch jobs submitted are targeted to each of the environments to be transformed. Each environment, however, is responsible for its own jobs and picks up those jobs in the dependency-based order determined by transform planner tool 120, maximizing parallel processing.

Audit format 124 is an indication of whether the data transform is eligible for bulk auditing. Bulk auditing is a process where the changes applied to a large volume of records are summarized and recorded in aggregate rather than individually. For example, rather than providing an audit record for each individual record change, a bulk audit may be written indicating that "1.2 million records were updated from x to y." Whether bulk auditing is available may depend on industry standards, legal requirements, or other policies. In some examples, whether bulk auditing is available is indicated by a user via transform builder application 110. In other examples, transform planner tool 120 may determine whether bulk auditing is available based on the data transform, the environments or tables to be transformed, known policies, or other relevant information. In some examples, bulk auditing is available for some of the data transform execution and not others based on, for example, the environment in which the transform is being executed. Once transform planner tool 120 determines the correct auditing format, the auditing plan is written into data transform execution plan 125.

Devops environment 105 also includes transform monitoring 135. Transform monitoring 135 is representative of any module, application, or other resource for monitoring the progress of a running data transform. Thus, as data transform logic block 115 executes on tenant environment 130 according to data transform execution plan 125, it reports back to transform monitoring 135 with updates on the progress and/or status of the transform. More specifically, as each job in each environment progresses, any messages written are reported back to the launching environment (i.e., devops environment 105) where an operations engineer can monitor them. As each job completes, it reports back to the launching environment and stores the result of the work (e.g., status, start/finish, summary).

Tenant environment 130 includes a multitude of tenants hosted on a platform associated with devops environment 105. Tenant environment 130 is an exemplary environment in which some embodiments of the present technology may be implemented. However, the technology described herein can be applied to a variety of environments needing data transformation and is not limited to multi-tenant environments like the one shown in FIG. 1. In the example of FIG. 1, however, devops environment 105 serves tenant environment 130, a multi-tenant environment. In a multi-tenant environment like tenant environment 130, the infrastructure is designed to serve multiple customers (i.e., tenants) from a single, shared instance of software. Each tenant operates independently with separate environments, applications, and databases, ensuring data isolation and customized configurations for each tenant. The multi-tenant architecture allows for efficient resource utilization, scalability, and centralized management while providing each tenant with the capability to run multiple applications and manage multiple databases within their allocated environment. The multi-tenant model therefore supports diverse customer requirements, offering tailored functionalities and data management solutions.

In the example of FIG. 1, the data transform is created by the SaaS provider and the transform is intended to be applied globally across all applicable tenants in tenant environment 130. However, in a multi-tenant SaaS environment, data transforms can be applied at different scopes depending on their intended impact. Some data transforms may be prepared and executed by internal development or operations (or devops) teams to ensure uniform updates, enhancements, or bug fixes across the entire platform. Thus, all tenants using the applications or databases affected by the data transform may benefit from the latest features and security improvements while maintaining consistency and integrity of the shared infrastructure.

However, in other examples, a data transform may be tenant specific. Individual tenants may at times require specific data transforms tailored to their unique needs. Tenant-specific transforms can be created and applied to the tenant themselves or with support from the SaaS provider. A tenant-specific data transform affects only the data within that particular tenant's environment, allowing customization and flexibility without impacting other tenants. In some embodiments, a tenant-specific data transform can be created and executed in a similar fashion to what is shown in the example of FIG. 1, but from within a tenant-specific devops environment. Thus, tenant 131, for example, may have access to a client-specific devops environment that is similar to devops environment 105, but for the specific needs of that tenant only. However, from within the tenant-specific devops environment, tenant 131 may use a transform builder application to create a data transform logic block, from which a data transform execution plan may be generated by a transform planner tool. The tenant-specific logic block may then be executed on the tenant environment according to the data transform execution plan to implement a data transformation within the tenant environment. In some examples, the tenant-specific devops environment may include a monitoring service like shown in devops environment 105 (i.e., transform monitoring 135).

Figure 2:
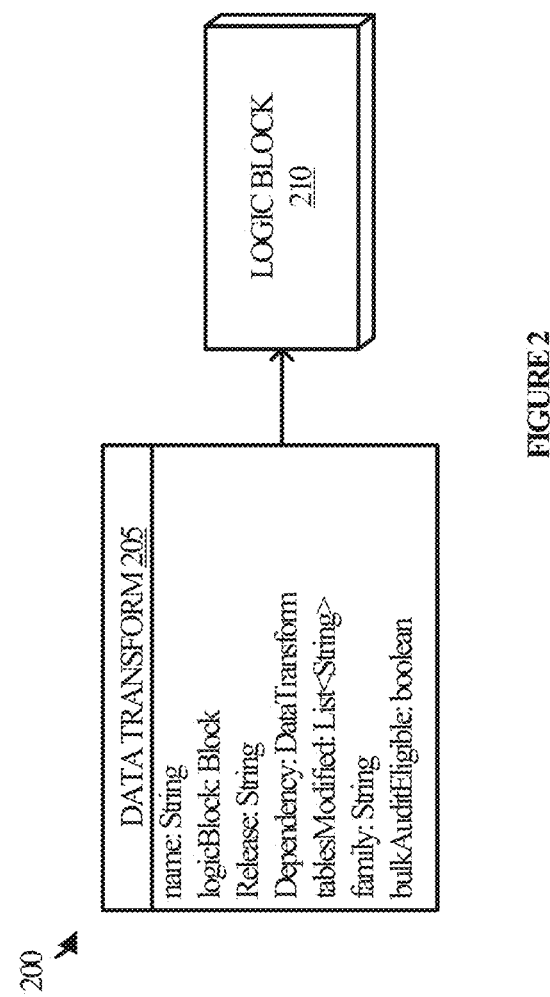
FIG. 2 illustrates an example of a data transform and logic block in accordance with some embodiments of the present technology.

FIG. 2 illustrates environment 200. Environment 200 includes data transform 205 and logic block 210. Data transform 205 and logic block 210 illustrate an example of how a user-defined data transform may be used to generate a logic block for executing the data transform. Data transform 205 includes information such as name, logic block, release, dependency, tables modified, family, and whether it is bulk audit eligible. As previously described, the information defining data transform 205 may be defined in a data transform builder application (e.g., transform builder application 110).

Data transforms, in accordance with some embodiments of the present technology, become eligible to run once represented as a record in a data transforms table, as represented in data transform 205 in FIG. 2. In registering a data transform, the developer may declare the release it applies to (if any) the family (i.e., solution) it belongs to, and any other data transforms on which it depends (i.e., which transform must execute first). The logic block metadata (i.e., metadata written in logic block 210 from data transform 205) is introspected (e.g., by transform planner tool 120) to determine what tables are mutated by the transform and whether or not the transform is eligible for bulk audit.

Figure 3:
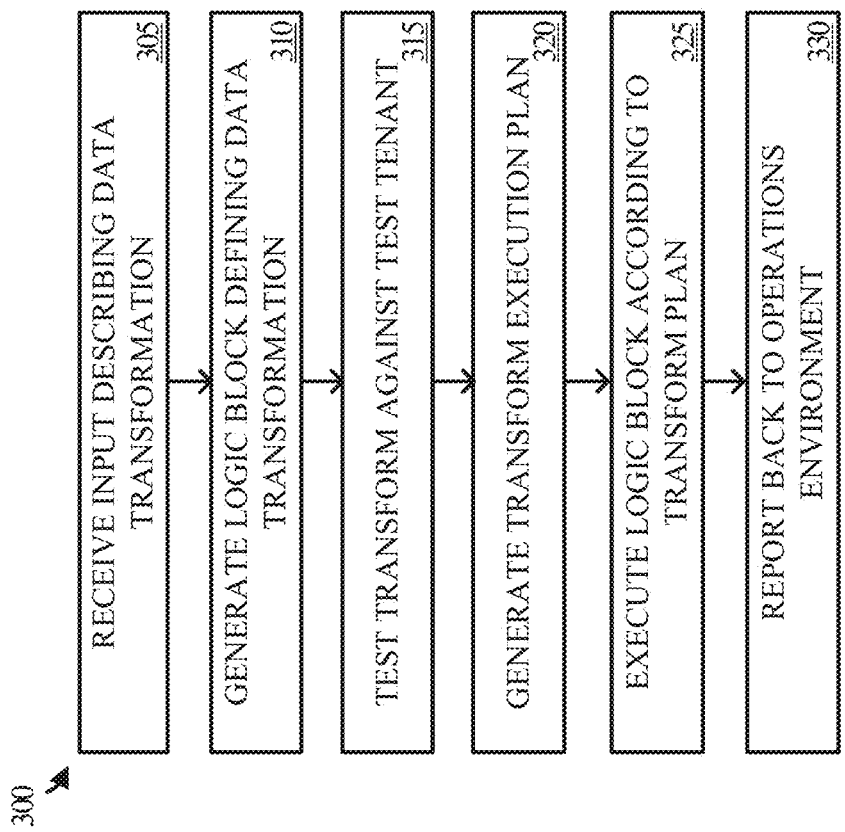
FIG. 3 is a flowchart illustrating a set of operations for implementing data transforms in accordance with some embodiments of the present technology.

FIG. 3 illustrates process 300. Process 300 is an exemplary operation performing data transformations in transform environment 100. The operations may vary in other examples. The operations of process 300, in some examples, are performed by various components of transform environment 100 including but not limited to transform builder application 110, transform planner tool 120, and transform monitoring 135. The operations of process 300 include receiving input describing a data transformation (step 305). In the example of FIG. 1, input describing a data transformation may be entered and saved via transform builder application 110, which receives the input from which to generate data transform logic block 115. The transform builder application may also be referred to herein as a logic block builder application.

Some examples of a data transforms that may be submitted by a user and received in step 305 include populating a new field in a table to ensure proper execution of programming logic, updating all records in a table with a specific value that is currently missing in some records, and migrating relevant data from an original table to new tables when a table is restructured and split into multiple tables. Transformations like these examples can be crucial for maintaining the seamless operation and reliability of the platform including the customer environments. These examples are just a few of the many scenarios where data transformations may be used and are not intended to limit the scope of the present disclosure. Numerous other situations may necessitate data transforms and are within the scope of this disclosure.

The operations of process 300 further include generating a logic block defining the data transformation (step 310) based on the information received in step 305. In the example of FIG. 1, transform builder application 110 is used to generate data transform logic block 115 defining the data transformation described via the builder application. Data transform logic block 115 includes all the necessary logic and/or instructions, defined by metadata, to carry out the transformation. The logic block will be used for executing the specific operations needed to modify the data, such as adding or removing fields, changing values, or migrating data between tables, according to the defined transformation requirements.

The operations of process 300 further include testing the data transform against a test tenant (step 315). Once registered, the data transform (e.g., data transform logic block 115) is tested against a test tenant. A test tenant is an isolated environment where records are seeded to emulate the data sets a tenant might have in their system. Since transforms as described herein often operate without the safety net of validations, security, or triggers, it can be disastrous to execute a transform against shared data sets, QA data sets, or customer data sets. Thus, in some embodiments, a test tenant provides a throw-away scenario where even if the transform has unexpected side effects, no actual data or tenants are harmed. When the data transform is tested against the test tenant, a data transform execution plan is created and executed for the test tenant environment. An application such as transform builder application 110 may then be used to view the test transform executions.

The operations of process 300 further include generating a transform execution plan (step 320). Once the logic block has been created and tested in the test environment, a transform execution plan is created that causes the tested transform to execute on all target environments. In the example of FIG. 1, transform planner tool 120 generates data transform execution plan 125. Important elements of the execution plan are the data transform list (i.e., what is to be run) and the environments list (i.e., where to run it). Other elements considered in generating the plan are whether the run is a draft or practice run, whether bulk auditing is available, and whether the transform has any explicit or implicit dependencies that dictate the order to transform operations, what operations can be run in parallel, and what operations must be run sequentially. In some examples, once the data transform execution plan is created and saved, data transform header and detail records are created, one per tenant environment, and set with a status of "new" indicating that it has not run yet (see, e.g., FIG. 5D).

The operations of process 300 further include executing the logic block according to the transform plan (step 325). In the example of FIG. 1, data transform logic block 115 is executed on one or more tenants of tenant environment 130 according to data transform execution plan 125. When the transform is executed (such as by pressing an "execute transforms" button in the app), the system submits jobs to the various tenant systems. The order in which jobs are submitted depends on explicit (or declared) and implicit (changes to the same table) dependencies.

The operations of process 300 further include reporting back to the operations environment with detail about the transformation jobs (step 330). In the example of FIG. 1, the progress is reported out via transform monitoring 135. Transform monitoring 135, in some examples, is displayed within transform builder application 110 or another application within devops environments 105. When the execution begins, job information is populated in the transform execution table in the application (see, e.g., FIG. 5E). If a job fails, an error message is created that details the error and points a developer to the circumstance that needs resolved.

The example of FIG. 3 is directed to data transforms delivered by the cloud-service provider via, for example, devops environment 105. However, what is additionally contemplated herein is tenant-created or tenant-targeted data transformations. A tenant-targeted data transformation is nearly identical to the transform scenario described above, except only the records for the targeted tenant are affected. All other tenants, even other tenants that may share the same environments are not included in the execution plan. In some examples, the tenant may control their own data transform to repair a data issued within their own tenant data. The tenant in that case takes the role of the devops personnel operating a tenant-facing version of the transform builder application, which may be limited compared to the application in the example of FIG. 1. For example, the tenant-facing version of the builder application may not provide bulk-audit options, may not provide access to environments the tenant does not specifically use, and may not provide a way to associate the data transform with a software release.

It should be understood that the steps outlined in process 300 are exemplary and intended to illustrate one possible implementation of the described data transformation methodology. It is understood that the process could encompass additional, fewer, or alternative steps, and that the sequence of these steps could be rearranged to suit specific requirements or constraints. The flexibility of the process allows for adaptation to various scenarios, ensuring that it can be tailored to meet diverse operational needs within the cloud-based service environment.

Figure 4:
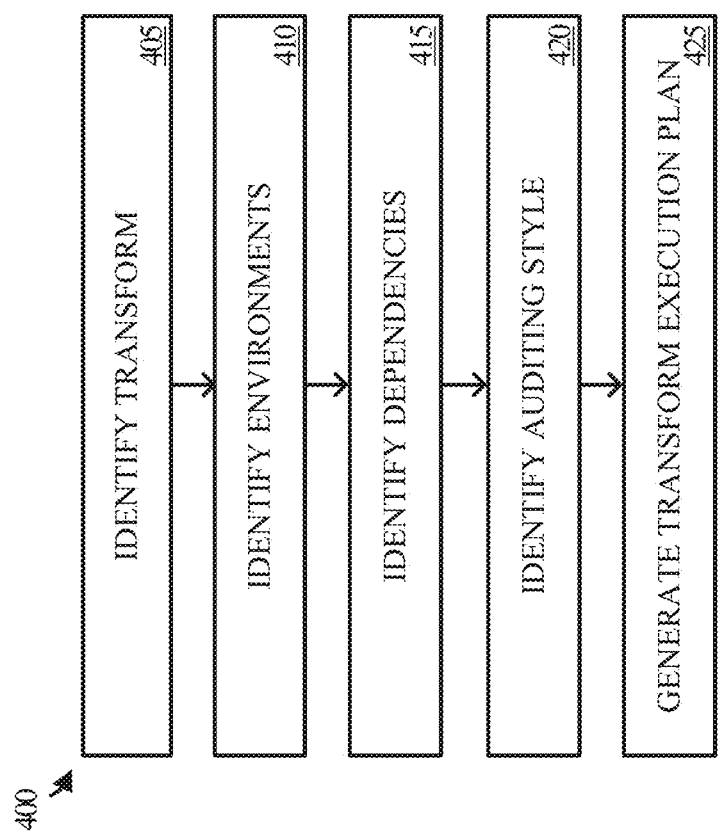
FIG. 4 is a flowchart illustrating a set of operations for generating transform execution plans in accordance with some embodiments of the present technology.

FIG. 4 illustrates process 400. Process 400 is an exemplary operation generating a transform execution plan in transform environment 100. The operations may vary in other examples. The operations of process 400, in some examples, are performed by various components of transform environment 100 including but not limited to transform builder application 110 and/or transform planner tool 120. The operations of process 400 include identifying a data transform (step 405). In the example of FIG. 1, this may include transform planner tool 120 receiving data transform logic block 115, which defines the data transformation.

The operations of process 400 further include identifying environments in which to perform the data transform (step 410). In the example of FIG. 1, transform planner tool 120 determines what environments from tenant environment 130 include tables that contain data needing to be transformed based on the data transform. Determining which environments the data transform applies to may involve an assessment of the transform's scope and impact, which includes identifying any requirements and objectives of the data transform, evaluating dependencies and potential ripple effects on various environments.

The operations of process 400 further include identifying dependencies (step 415). In the example of FIG. 1, transform planner tool 120 identifies any dependencies for executing data transform logic block 115. As previously described, the order in which jobs are submitted depends on explicit and implicit dependencies. Explicit dependencies may include dependencies that are declared via the transform builder application while defining the transform. Implicit dependencies may include dependencies that are not declared but arise merely from changes occurring on the same table, same piece of data, or the like.

Figure 5A:
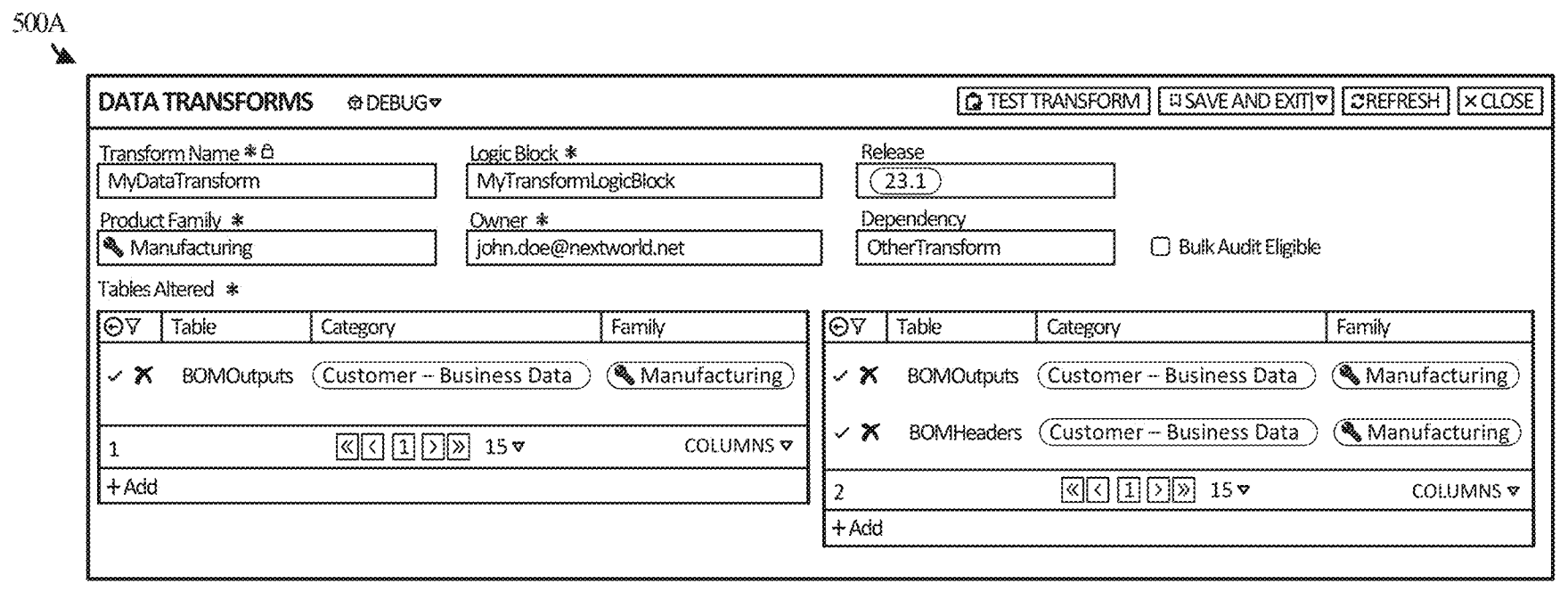

The operations of process 400 further include identifying an auditing style (step 420). In the example of FIG. 1, transform planner tool 120 identifies an auditing style based on what is indicated via transform builder application 110. In the example of FIG. 5A, the application includes a checkbox for indicating whether the transform is eligible for bulk auditing. In other examples, however, whether bulk auditing is available may be determined by transform planner tool 120 after the transform is submitted.

The operations of process 400 further include generating the transform execution plan (step 425). In the example of FIG. 1, transform planner tool 120 generates data transform execution plan 125 based on the information or identifications made during steps 405-420 of process 400. The steps outlined in process 400 are exemplary and intended to illustrate one possible implementation of the described data transformation methodology. It is understood that the process could encompass additional, fewer, or alternative steps, and that the sequence of these steps could be rearranged to suit specific requirements or constraints. The flexibility of the process allows for adaptation to various scenarios, ensuring that it can be tailored to meet diverse operational needs within the cloud-based service environment.

Figure 5B:
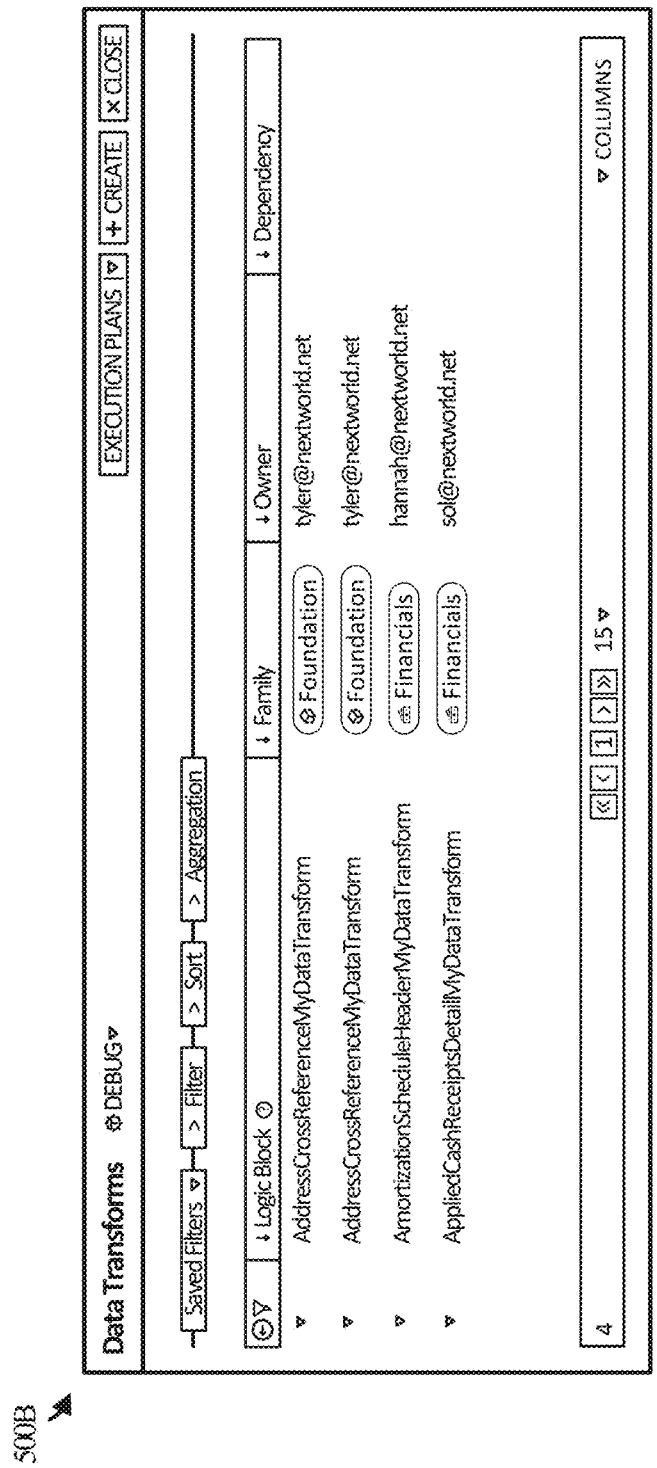

FIGS. 5A-5E show exemplary views of a graphical user interface (GUI) for creating and monitoring data transforms in accordance with some embodiments of the present technology. The GUIs shown in FIGS. 5A-5E may be displayed in the context of a transform builder application, such as transform builder application 110 from FIG. 1, or displayed in the context of other applications for defining and/or monitoring data transforms as described herein. FIG. 5A shows view 500A. View 500A shows the GUI of a data transform builder application during the creation of a new data transform logic block named "MyDataTransform." Information about the new data transform is entered into various input fields in view 500A before the logic block and execution plan for the data transform are created.

View 500A includes a "Transform Name" field, a "Logic Block" field, a "Release" field, a "Product Family" field, an "Owner" field, and a "Dependency" field. View 500A also includes a checkbox for indicating whether bulk auditing is available for the data transform. View 500A also includes clickable and/or dropdown options to test the transform, save and exit, refresh the page, and close. The data transform logic block is created via view 500A of a transform creation application. The data transform in the current examples (i.e., "MyData Transform") will be used to create the "MyTransformLogicBlock" logic block, executed at the boundary of software release "23.1," is associated with the "Manufacturing" product family, and has a declared dependency with "OtherTransform."

FIG. 5B shows view 500B. View 500B shows the GUI after a set of data transforms and their corresponding logic blocks have been created. View 500B shows a table with a list of four defined data transforms and their corresponding logic blocks, family, and owner. View 500B also includes clickable drop downs or options to go to the execution plans, to create transforms, or close the window.

Figure 5C:
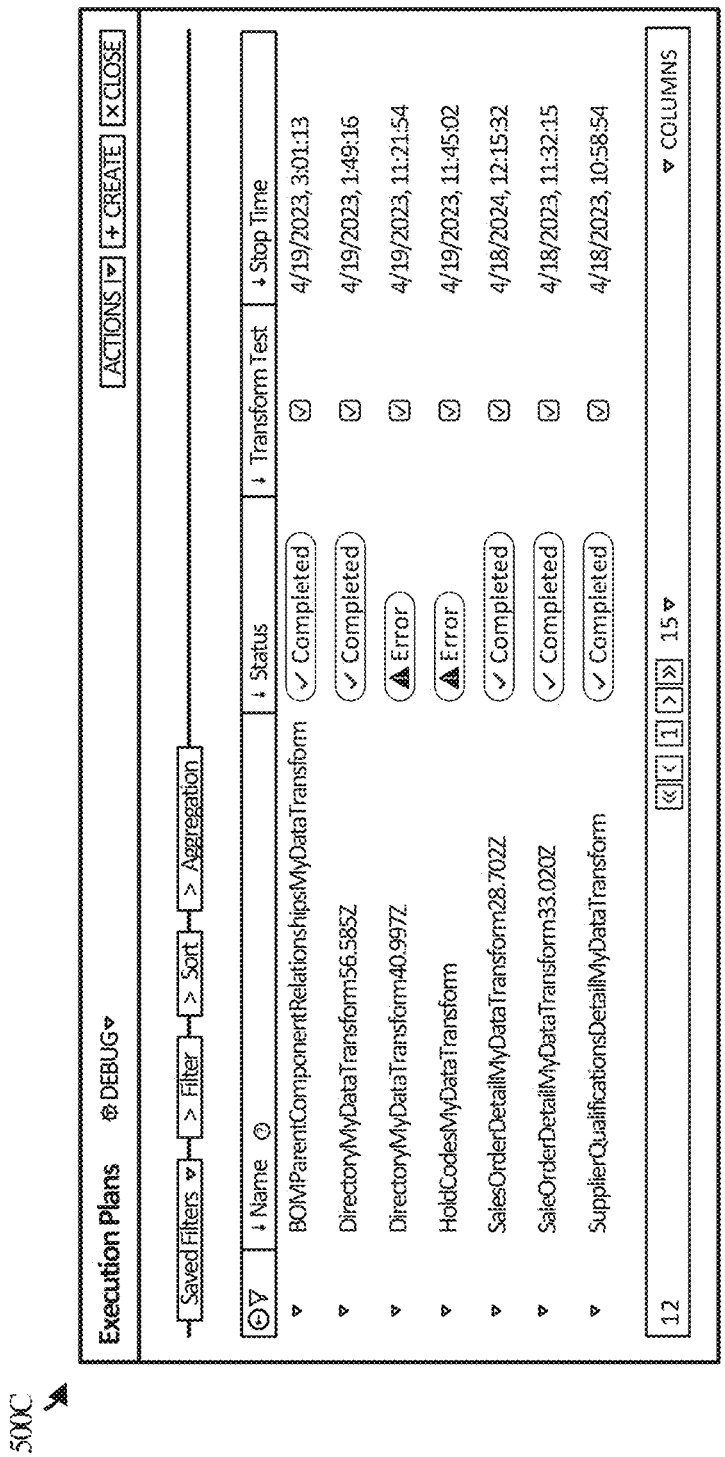

FIG. 5C shows view 500C. View 500C shows the GUI after a set of execution plans have been created and run in a test format. View 500C shows a table with a list of execution plans and their corresponding names, status, testing status, and finish times. The status of each transform plan shows whether the transform plan test completed or did not complete due to an error. In the example of FIG. 5C, each execution plan has a box checked in the "transform test" column, indicating that the run of each transform plan was a test run and not a real run affecting real environments and data.

FIG. 5D shows view 500D. View 500D shows the GUI in the execution phase of performing a data transformation. View 500D provides information about data transform logic blocks being run or going to be run in various environments. In the example of FIG. 5D, none of the transforms have been executed yet, as indicated by their "New" status shown in the status column of the table. For each data transform, information is displayed indicating the name of the associated logic block, the tenant in which the logic block will run, the environment in which the logic block will run, whether bulk auditing is turned on for the transform, and a status. Additional columns shown include an "ID" column and a "job status" column, which are not filled in before execution of the logic blocks.

FIG. 5E shows view 500E. View 500E shows the GUI after execution of the logic blocks from FIG. 5D. As can be seen, the status of each logic block has changed to "Completed" or "Error," depending on whether the logic block successfully completed the data transformation or not. Columns including "ID," "job status," and "summary" are filled in with information corresponding to the execution of each logic block. In some examples, view 500E is representative of what is shown in the application related to transform monitoring 135 from FIG. 1.

The GUI illustrations depicted in FIGS. 5A-5E are exemplary and serve to demonstrate one potential embodiment of the interface design. It should be understood that the actual implementation of the GUI could vary significantly, with different layouts, elements, and functionalities, to accommodate specific user needs or system requirements. These variations may include alternative configurations, designs, and interactive components, all of which fall within the scope of the invention.

Figure 6:
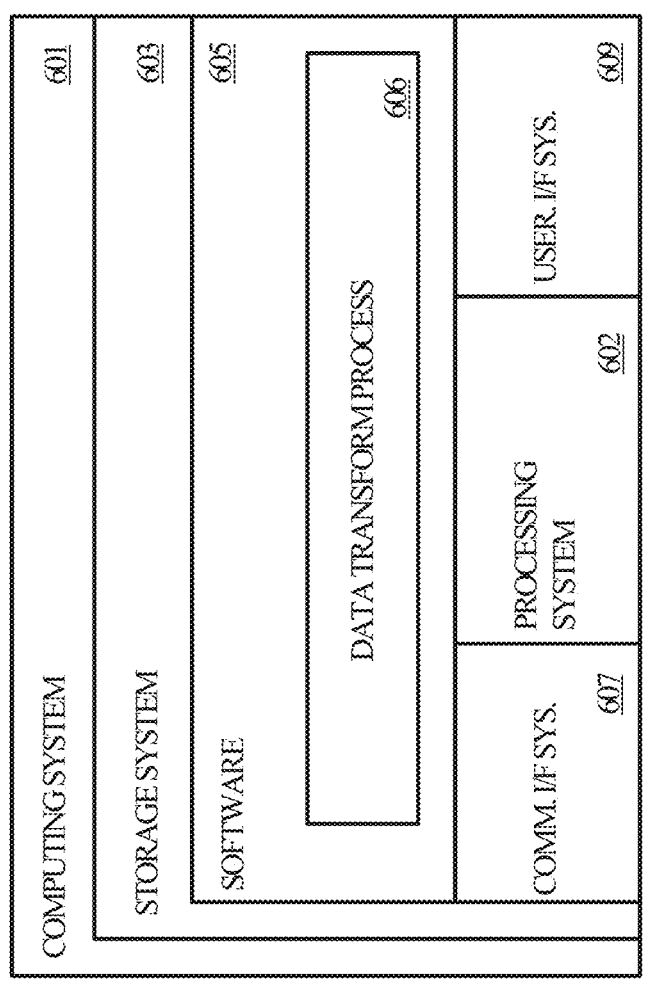
FIG. 6 is an example of a computing system in which some embodiments of the present technology may be utilized.

FIG. 6 illustrates computing system 601 to perform data transformations according to an implementation of the present technology. Computing system 601 is representative of any computing system or collection of systems with which the various operational architectures, processes, scenarios, and sequences disclosed herein for transforming data. Computing system 601 may be implemented as a single apparatus, system, or device or may be implemented in a distributed manner as multiple apparatuses, systems, or devices.

Computing system includes 601 storage system 603, communication interface 607, user interface 609, and processing system 602. Processing system 602 is linked to communication interface 607 and user interface 609. Storage system 603 stores software 605, which includes data transform process 606. Computing system 601 may include other well-known components such as batteries and enclosures that are not shown in the present example for clarity. Examples of computing system 601 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 602 loads and executes software 605 from storage system 603. Software 605 includes and implements data transform process 606, which is representative of the data transform operations discussed with respect to the preceding figures. When executed by processing system 602 to perform the processes described herein, software 605 directs processing system 602 to operate as described for at least the various processes, operational scenarios, and sequences discussed in the foregoing implementations. Computing system 601 may optionally include additional devices, features, or functionality not discussed for purposes of brevity.

Referring still to FIG. 6, processing system 602 may include a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 include general purpose central processing units, graphical processing units, application specific processors, and logic devices, as well as any other type of processing devices, combinations, or variations thereof.

User interface 609 includes components that interact with a user to receive user inputs and to present media and/or information. User interface 609 may include a speaker, microphone, buttons, lights, display screen, touch screen, touch pad, scroll wheel, communication port, or some other user input/output apparatus, including combinations thereof. User interface 609 may be omitted in some examples.

Storage system 603 may include any computer-readable storage media readable by processing system 602 and capable of storing software 605. Storage system 603 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations storage system 603 may also include computer-readable communication media over which at least some of software 605 may be communicated internally or externally. Storage system 603 may be implemented as a single storage device but may also be implemented across multiple storage devices or sub-systems co-located or distributed relative to each other. Storage system 603 may include additional elements, such as a controller, capable of communicating with processing system 602 or possibly other systems.

Software 605 (including data transform process 606) may be implemented in program instructions and among other functions may, when executed by processing system 602, direct processing system 602 to operate as described with respect to the various operational scenarios, sequences, and processes illustrated herein. For example, software 605 may include program instructions for executing data transforms in a cloud-based service environment as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also include firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to perform data transforms as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 607 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 607 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The techniques introduced herein may be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media or machine-readable medium suitable for storing electronic instructions.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," "environment," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method comprising:
receiving, by a computing system comprising at least one processor and at least one non-transitory computer-readable storage medium, an input describing a data transformation;
generating, by the computing system, a logic block defining the data transformation;
generating, by the computing system, a transform plan for performing the data transformation, wherein generating the transform plan comprises:
identifying at least one table storing data on which to perform the data transformation;
identifying, by introspective tooling executing on the computing system, one or more dependencies between the at least one table and another source of data;
determining, by the introspective tooling, an order of operations for performing the data transformation based on the one or more dependencies; and
optimizing, by the introspective tooling, the data transformation by identifying one or more operations eligible for parallel processing based at least in part on the dependencies; and
executing, by the computing system, the logic block according to the transform plan to transform the data stored in the at least one table, wherein executing the logic block according to the transform plan includes performing the one or more operations eligible for parallel processing in parallel.

2. The method of claim 1 wherein the logic block defining the data transformation comprises metadata defining the data transformation.

3. The method of claim 1, further comprising reporting, by the computing system, execution status and results of the data transformation to a monitoring system, wherein the monitoring system aggregates status information from multiple environments for assessment.

4. The method of claim 1 wherein generating the transform plan further comprises identifying at least one environment in which to perform the data transformation, wherein the at least one environment comprises the at least one table.

5. The method of claim 1 wherein optimizing the data transformation further includes minimizing time spent performing the data transformation.

6. The method of claim 1 wherein;
generating the transform plan further comprises determining that bulk auditing is available for the data transformation based on one or more compliance rules; and
executing the logic block according to the transform plan further includes performing the bulk auditing, wherein the bulk auditing comprises generating an aggregate audit record summarizing changes made to the data stored in the at least one table.

7. The method of claim 1 wherein the input describing the data transformation is entered into fields in a logic blocks application by one or more users.

8. The method of claim 1 wherein the data transformation comprises at least one of adding a field, removing a field, and changing a field of the data stored in the at least one table.

9. A system comprising:
one or more non-transitory computer-readable storage media;
one or more processors operatively coupled with the one or more non-transitory computer-readable storage media; and
program instructions stored on the one or more non-transitory computer-readable storage media, wherein the program instructions, when read and executed by the one or more processors, direct the one or more processors to at least:
receive an input describing a data transformation;
generate a logic block defining the data transformation;
generate a transform plan for performing the data transformation, wherein to generate the transform plan, the program instructions direct the one or more processors to:
identify at least one table storing data on which to perform the data transformation;
identify one or more dependencies between the at least one table and another source of data;
determine an order of operations for performing the data transformation based on the one or more dependencies; and
optimize the data transformation, wherein to optimize the data transformation, the program instructions direct the one or more processors to identify one or more operations eligible for parallel processing based at least in part on the dependencies; and
execute the logic block according to the transform plan to transform the data stored in the at least one table, wherein to execute the logic block according to the transform plan, the program instructions direct the one or more processors to perform the one or more operations eligible for parallel processing in parallel.

10. The system of claim 9 wherein the logic block defining the data transformation comprises metadata defining the data transformation.

11. The system of claim 9 wherein the program instructions further direct the one or more processors to report execution status and results of the data transformation to a monitoring system, wherein the monitoring system aggregates status information from multiple environments for assessment.

12. The system of claim 9 wherein to generate the transform plan, the program instructions further direct the one or more processors to identify at least one environment in which to perform the data transformation, wherein the at least one environment comprises the at least one table.

13. The system of claim 9 wherein to optimize the data transformation, the program instructions further direct the one or more processors to minimize time spent performing the data transformation.

14. The system of claim 9 wherein;
to generate the transform plan, the program instructions further direct the one or more processors to determine that bulk auditing is available for the data transformation based on one or more compliance rules; and
to execute the logic block according to the transform plan, the program instructions direct the one or more processors to generate an aggregate audit record summarizing changes made to the data stored in the at least one table.

15. The system of claim 9 wherein the input describing the data transformation is entered into fields in a logic blocks application by one or more users.

16. The system of claim 9 wherein the data transformation comprises at least one of adding a field, removing a field, and changing a field of the data stored in the at least one table.

17. One or more non-transitory computer readable storage media having program instructions stored thereon for performing data transformations, wherein the program instructions, when read and executed by a processing system, direct the processing system to at least:
   receive an input describing a data transformation;
   generate a logic block defining the data transformation;
   generate a transform plan for performing the data transformation, wherein to generate the transform plan, the program instructions direct the processing system to:
      identify at least one table storing data on which to perform the data transformation;
      identify one or more dependencies between the at least one table and another source of data;
      determine an order of operations for performing the data transformation based on the one or more dependencies; and
      optimize the data transformation by identifying one or more operations eligible for parallel processing based at least in part on the dependencies; and
   execute the logic block according to the transform plan to transform the data stored in the at least one table, wherein to execute the logic block according to the transform plan, the program instructions direct the processing system to perform the one or more operations eligible for parallel processing in parallel.

18. The one or more non-transitory computer readable storage media of claim 17 wherein the logic block defining the data transformation comprises metadata defining the data transformation.

19. The one or more non-transitory computer readable storage media of claim 17 wherein the program instructions further direct the processing system to report execution status and results of the data transformation to a monitoring system, wherein the monitoring system aggregates status information from multiple environments for assessment.

20. The one or more non-transitory computer readable storage media of claim 17 wherein to generate the transform plan, the program instructions further direct the processing system to identify at least one environment in which to perform the data transformation, wherein the at least one environment comprises the at least one table.

* * * * *